United States Patent [19]

Patton et al.

[11] Patent Number: 4,866,363
[45] Date of Patent: Sep. 12, 1989

[54] FAIL-SAFE POTENTIOMETER FEEDBACK SYSTEM

[75] Inventors: Patton, Rockford; William R. Landis, Bloomington, both of Minn.

[73] Assignee: Honeywell Inc., Minneapolis, Minn.

[21] Appl. No.: 99,369

[22] Filed: Sep. 21, 1987

[51] Int. Cl.⁴ .............................................. G05B 1/06
[52] U.S. Cl. .................................... 318/663; 318/603; 431/24; 431/59
[58] Field of Search ............................ 431/18, 24–25, 431/29, 42, 59, 66–73, 78, 80; 318/563, 565, 600, 601, 603, 628, 652, 663, 638, 641, 644–645

[56] References Cited

U.S. PATENT DOCUMENTS

| | | | |
|---|---|---|---|
| 4,031,442 | 6/1977 | Poppelreiter, II | 318/663 |
| 4,078,198 | 3/1978 | Murakosi et al. | 318/627 |
| 4,476,415 | 10/1984 | Kautz et al. | 318/135 |
| 4,481,451 | 11/1984 | Kautz et al. | 318/628 |
| 4,484,122 | 11/1984 | Day et al. | 318/663 |
| 4,518,345 | 5/1985 | Mueller et al. | 431/24 |
| 4,636,701 | 1/1987 | Kodera et al. | 318/663 |
| 4,712,053 | 12/1987 | Numata | 318/663 |

*Primary Examiner*—William M. Shoop, Jr.
*Assistant Examiner*—David Martin
*Attorney, Agent, or Firm*—Alfred N. Feldman

[57] ABSTRACT

A fail-safe electronic position monitoring system for a motor is specifically described in a flame safeguard system. The same fail-safe system could be used more generally in any type of positional monitoring system using a potentiometer. The potentiometer and its wiper are monitored by a microcomputer which has stored in its memory a profile of at least three critical parameters. The parameters are a low voltage parameter, a high voltage parameter, and a parameter that deals with the rate of the voltage level change. The rate voltage level change includes monotonocity function.

10 Claims, 5 Drawing Sheets

| FAULT | RESPONSE TIME MONITORING | MONOTONOCITY OR SLEW RATE TEST | MINIMUM SLEW TIME TEST | LIMIT TEST (LOW WIPER VOLTAGE) | LIMIT TEST (HIGH WIPER VOLTAGE) |
|---|---|---|---|---|---|
| OPEN SUPPLY LINE 22 | S | S |   | P |   |
| OPEN WIPER LINE 24 | S | S |   | P |   |
| OPEN COMMON LINE 23 | S | S |   |   | P |
| WIPER-SUPPLY LINE SHORT | S | S |   |   | P |
| WIPER-COMMON LINE SHORT | S | S |   | P |   |
| SUPPLY-COMMON LINE SHORT | S | S |   | P |   |
| CRACKED POTENTIOMETER | S | S |   | P | P |
| FAULTY A/D PORT | S | P | P |   |   |
| NOISY ELECTRICAL JOINT |   | P |   | S | S |
| OPEN DAMPER MOTOR DRIVE CIRCUIT | S | P |   |   |   |
| STICKY OR SLOW DAMPER MOTOR | P | S |   |   |   |
| WORN POTENTIOMETER |   | P | P |   |   |
| FAST DAMPER MOTOR |   |   | P |   |   |

P = PRIMARY TEST
S = SECONDARY TEST

FAIL-SAFE POTENTIOMETER FEEDBACK SYSTEM

BACKGROUND OF THE INVENTION

In many types of motor-driven systems it is desirable to have an indication of the position of the load driven by the motor. Many such systems utilize a potentiometer whose wiper is driven by the motor or its load. The potentiometer is then connected into a feedback system, and its wiper voltage is used as an indication of the position of the motor or load. This type of arrangement is very inexpensive, but has certain problems relating to reliability.

The potentiometer driven by the motor or its load can provide an inaccurate signal under many different types of fault conditions. The potentiometer can become open circuited, its wiper can become disengaged from the potentiometer body by dirt or wear, or the potentiometer can become so worn as to provide an inaccurate feedback signal. In many types of systems the accuracy of the feedback signal is critical. In these types of situations other means in addition to a potentiometer feedback system are utilized.

Where safety is involved and the exact position of a load must be accurately reported to the system, means such as limit switches have been used. When the motor drives the load to a required position the switches are activated and their signal is returned to the control system. It is apparent that this type of arrangement has costs related to the need to mount the switches, and to add the wiring from the switches back to the control device.

SUMMARY OF THE INVENTION

The present invention is directed to a means for making a position monitoring system, that uses a potentiometer, fail-safe. The shortcomings of a potentiometer-based position monitoring system are overcome in the present invention by monitoring a number of parameters from the potentiometer means.

The advent of microcomputers with their related intelligence makes it possible to monitor a position feedback potentiometer means in a manner that reliably assesses its operation and wiper position. In the present invention, a microcomputer-based system supplies a regulated voltage to a potentiometer and measures its wiper voltage and its applied voltage. The measured voltages are fed through an analog-to-digital converter into the microcomputer that controls the motor or actuator position. The microcomputer checks a number of parameters of the voltage to and from the potentiometer means, and thereby is able to determine whether the position signal being received by the microcomputer is reliable. By checking the veracity of the position signal with the microcomputer, it is possible to substitute a very simple potentiometer position feedback system for a system which typically would utilize multiple switches for monitoring whether an output load reaches its required positions.

The present invention is particularly adapted for monitoring the position of a load such as a combustion air damper in a fuel burner system. Fuel burner systems typically require that switches be mechanically operated by the combustion air damper to verify certain damper positions. With the present invention, it is possible to use a damper position feedback potentiometer and eliminate the switches.

The monitoring of voltage to and from the potentiometer means checks many of its functions and determines whether a voltage is within expected limits, and whether a voltage is changing in an expected manner. The direction and rate of potentiometer wiper voltage change is compared with values either stored in microcomputer memory or determined by the position control program stored in computer memory.

By monitoring the voltage levels it is possible to establish such safety related functions as whether the voltage applied to the potentiometer is correct, whether the potentiometer voltage supply line is open or short circuited, whether the potentiometer is faulty, whether the analog-to-digital converter is functioning properly, and whether there is a noisy electrical connection generating a signal of an improper type. If the microcomputer system includes a clock or timer function, the time required for a given load position change can be used as a further safety-related parameter.

In accordance with the present invention, there is provided a flame safeguard sequencer for the control of a fuel burner upon the operation of controller means with said fuel burner having damper means, ignition means, fuel supply means, and flame sensor means, including: a flame safeguard sequencer connected to said damper means, said ignition means, said fuel supply means, and said flame sensor means to sequentially operate said means to properly purge, ignite and operate said fuel burner in a predetermined timed sequence upon operation of said controller means; said flame sensor means energized by said sequencer to monitor said burner for the presence or absence of flame upon said controller means operating to initiate the operation of said fuel burner; a fail-safe position monitoring system for said damper means with said damper means having motor means and motor position feedback potentiometer means; said flame safeguard sequencer further having voltage output means; said voltage output means providing an energizing voltage to said potentiometer means; said motor means including said feedback potentiometer means with said motor means constructed and arranged to operate a wiper of said feedback potentiometer means to provide a feedback voltage to said flame safeguard sequencer as an indication of a position of said damper means; said sequencer having input means receiving said feedback voltage; said sequencer further including microcomputer means having memory means, and said microcomputer means with said memory means comparing said feedback voltage provided by said feedback potentiometer means and said energizing voltage with nominal voltages stored in said memory means for sensing proper operation of said sequencer; and said sequencer including in said microcomputer means a safety system means for comparison of said feedback voltage to an established nominal voltage level profile stored in said memory means to check the accuracy of the position monitoring system.

Further in accordance with the present invention, there is provided a fail-safe electronic position monitoring system for motor means having motor position feedback potentiometer means, including: control system means having input means and output means with said input means responsive to a control input command, and having output signal means connected to control said motor means; said output means further providing an energizing voltage having a preselected level to said potentiometer means; said motor means having an output member adapted to operate a load; said motor means including said feedback potentiometer means with said motor means constructed and arranged to operate a wiper of said feedback potentiometer means to provide a feedback voltage to said control system means as an indication of a position of said output member; said control system means input means receiving said feedback voltage; said control system means including microcomputer means having memory means in which are stored nominal feedback and energizing voltage levels and a nominal established voltage level profile; said microcomputer means with said memory means comparing said feedback voltage and said energizing voltage levels respectively with the nominal feedback and energizing voltage levels stored in said memory means for sensing proper operation of said sequencer; and said microcomputer means includes safety system means for comparing said feedback voltage with the nominal established voltage level profile stored in said memory means to check the accuracy of the position monitoring system.

BRIEF DESCRIPTION OF THE DRAWINGS

FIG. 4 (A, B and C) is a flow chart of the novel portion of operation of the disclosed systems.

DESCRIPTION OF THE PREFERRED EMBODIMENT

Figure 1:
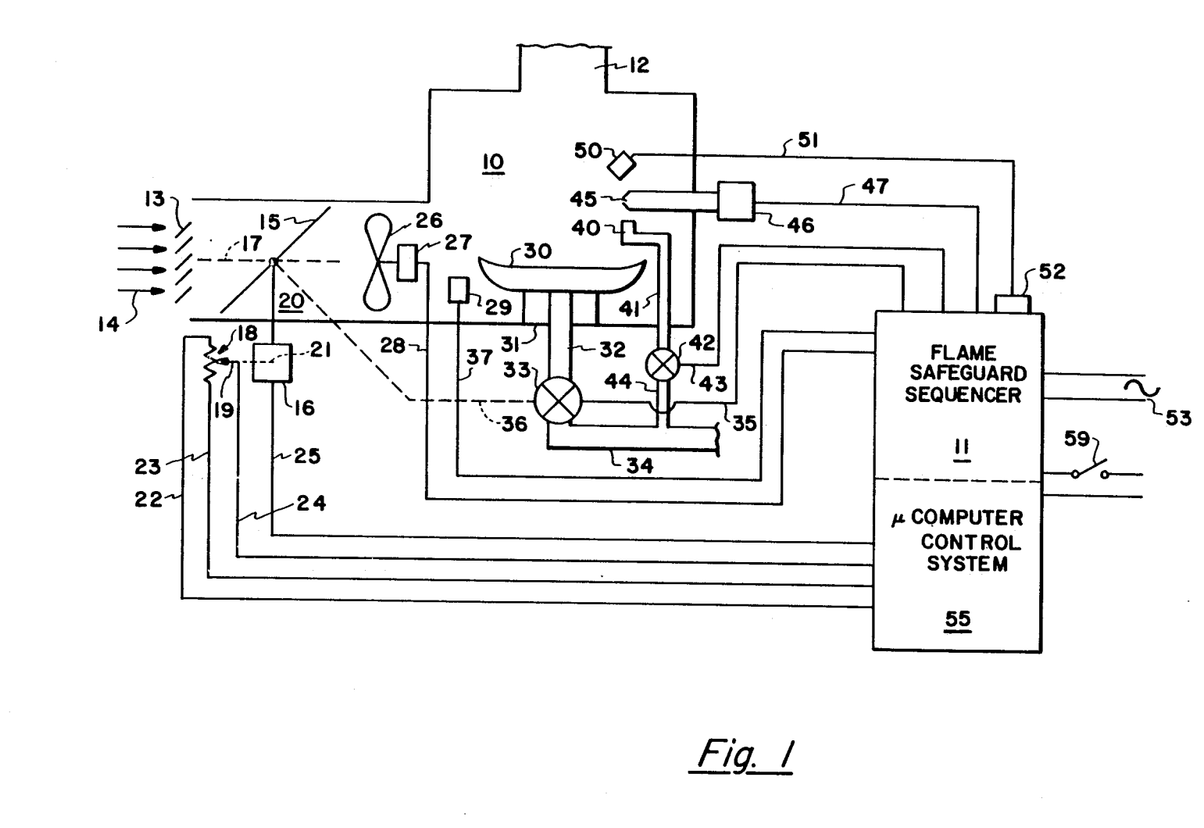
FIG. 1 is a schematic representation of a fuel burner including the novel fail-safe electronic follow-up system.

In FIG. 1 there is schematically disclosed a fuel burner 10 which is operated under the control of a flame safeguard sequencer 11. The flame sequencer 11 typically would operate the fuel burner 10 in any conventional sequence. The fuel burner is disclosed as having an air inlet 13 with air flow schematically indicated at 14. The air inlet 13 is regulated by a damper 15 that is driven by a damper drive motor means 16. The damper 15 is shown in a semiclosed position which will be referred to as a low fire position. A second position disclosed at 17, with the damper open, will be referred to as a high fire position. The damper drive motor means 16 is connected by conductors 25 to the flame safeguard sequencer 11 so that the motor means can be operated to drive the damper 15.

A fail-safe potentiometer means 18 is disclosed as having a wiper 19 with the wiper mechanically coupled at 21 to the motor means 16. As the motor means 16 operates, the wiper 19 operates with the potentiometer means 18. A voltage is supplied by conductors 22 and 23 to the potentiometer means 18 from the flame safeguard sequencer 11. The manner in which the voltage is supplied will be shown in more detail in connection with FIG. 2. The wiper 19 provides a feedback voltage by a conductor 24 to a microcomputer control system 55 that functions within the flame safeguard sequencer 11.

The fuel burner 10 further has a fan or air source 26 driven by a conventional motor 27 that is connected by conductors 28 to the sequencer 11. An air flow or sail switch 29 is proved to sense the actual flow of air and is connected by conductors 37 to the sequencer 11. The fan 26 provides the burner 10 with an air flow 14 from the inlet 13 to the stack 12 to provide combustion air and to provide a prepurge and postpurge operation of the burner, when required, and is proven by switch 29.

A burner is schematically disclosed at 30 mounted to the bottom 31 of the fuel burner 10 and supplied fuel by a pipe 32 from a valve 33 connected to a fuel line 34. The valve 33 is connected by electric conductors 35 to the sequencer 11, and also can be connected by a linkage 36 to the damper 15. This is done in order to adjust the flow of fuel through the valve 33 with the position of the damper 15, in addition to controlling the fuel flow through the valve 33 in an off-on manner by control signals via conductors 35.

A pilot burner 40 is mounted at the main fuel burner 30 and is connected by a pipe 41 to a pilot fuel valve 42 that has electrical connection means or conductors 43 connected to the sequencer 11. The pilot fuel valve 42 is connected by a pipe 44 to the main fuel pipe 34, as would be used in a gas only installation. The particular type of fuel for the main burner 30 and the pilot burner 40 is not material to the present invention, and the presently disclosed arrangement is purely schematic in nature in order to provide an explanation of an operation of the present invention.

The fuel burner 10 is completed by the provision of an ignition source 45 disclosed as a pair of spark electrodes that are connected to a spark generating means 46 that is connected by conductors 47 to the sequencer 11 to receive power and control. Also provided is a flame sensor means 50 that is connected by conductors 51 to a flame sensor amplifier 52. The amplifier 52 ca be designed to plug into the flame safeguard sequencer 11. The sequencer 11 is energized from a conventional line source at 53. The burner 10 is activated upon the operation of a controller 59.

Figure 2:
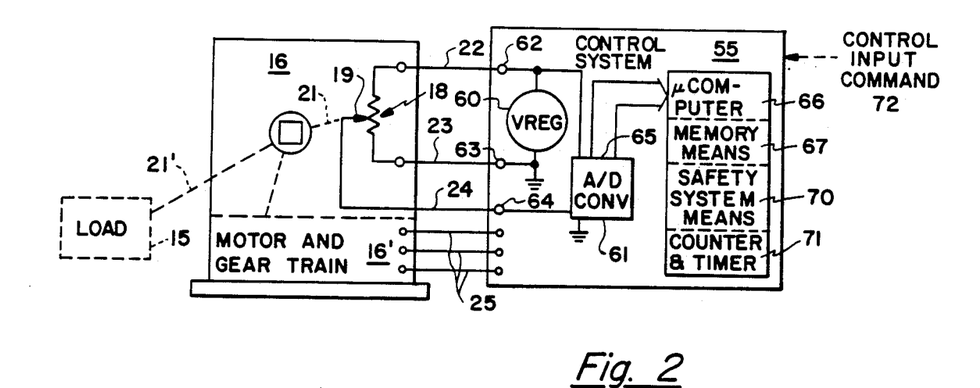
FIG. 2 is a more generalized disclosure of a fail-safe electronic follow-up system.

In FIG. 2 a fail-safe electronic position monitoring system is shown in a more general form for control of motor means 16. The motor means 16 typically would have a motor and gear train 16' to drive an output means coupled at 21' to the load 15 and at 21 to drive the position feedback potentiometer wiper 19. The motor and gear train 16' are energized over conductors 25 from the control system 55 in a conventional manner and the details of the energizing potential have not been shown. Further, it is possible that the control system 55 could be operating an electro-pneumatic type of motor 16 to drive a load 15. The present invention is not limited specifically to an electrical motor, but is directed generally to any type of motor means having an output 21' adapted to drive a load 15. The only portion of the motor means 16 that is essentially electrical or electronic is the potentiometer means 18 and the wiper 19.

A regulated voltage supply 60 is provided within the control system 55 along with a multi-input analog-to-digital converter shown at 61. The voltage regulator supplies a regulated potential at terminals 62 and 63 to in turn provide a regulated voltage on the conductors 22 and 23 to bias the potentiometer means 18. Under these circumstances, a voltage will be fed back on conductor 24 from the wiper 19, and that voltage has a direct relationship to the position of the wiper 19 with respect to the potentiometer means 18. The feedback voltage from the wiper 19 is provided by the conductor 24 to a terminal 64 which in turn is connected to the analog-to-digital converter 61. The analog-to-digital converter also monitors the regulated voltage at terminal 62.

The analog-to-digital converter 61 provides a digital output at data bus 65 that is connected to a microcomputer 66. The microcomputer 66 contains a memory 67, and further would have a safety system 70, and a counter and timer means 71. The overall control system 55 receives a control input command 72 that could be a command such as that generated at the flame safeguard sequencer 11 of FIG. 1. In FIG. 2 the load 15 would include the damper of the flame safeguard system shown in FIG. 1.

The more generalized disclosure of FIG. 2 can be readily applied to the flame safeguard sequencer of FIG. 1, or could stand by itself as a fail-safe electronic follow-up system for any type of motor means having a motor position follow-up potentiometer means 18.

THE OPERATION OF FIG. 2

The control input command 72 instructs the microcomputer 66 of the need to change a position of the load 15. The microcomputer 66 provides an output on conductors 25 to the motor and gear train 16' of the motor means 16. The motor means 16 operates through the means 21 and gear train 21' to drive the load 15. In a simple case, the load 15 again would be a damper in the burner system 10 of FIG. 1. As the motor and gear train 16' operate, the wiper 19 moves with respect to the potentiometer means 18 and an analog output voltage is fed back via line 24 through terminal 64 to the analog-to-digital converter 61 which converts it to digital form and sends it to the microcomputer 66 via data bus 65. The microcomputer 66 compares the feedback voltage against the value that should be attained for the commanded motor position. While the motor is in motion, the microcomputer 66 evaluates the rate of wiper voltage change and its direction. This insures that the wiper 19 is moving at a preordained rate and a preordained direction (monotonicity test).

Further, the fail-safe electronic position monitoring system disclosed monitors a number of other potential faults. These will be brought out in detail in chart form in FIG. 3. Very briefly, however, in the event that the supply line 22 opens, the wiper line 24 opens, or the common line 23 opens, the voltage fed back to the microcomputer 66 changes radically and can be immediately compared with the computed voltage requirement to substantially instantaneously detect a fault and cause an appropriate response. Many other functions are also monitored such as short circuits between the various conductors, a cracked or defective potentiometer means 18, a faulty analog-to-digital converter 61, a noisy joint in the system, and the quality or state of wear of the potentiometer by use of the monotonicity test along with the wiper position rate of change test. As previously indicated, these features are defined in the form of a chart in FIG. 3, and by way of a flow chart of FIG. 4 (A, B and C) which clearly defines the present invention.

Figure 3:
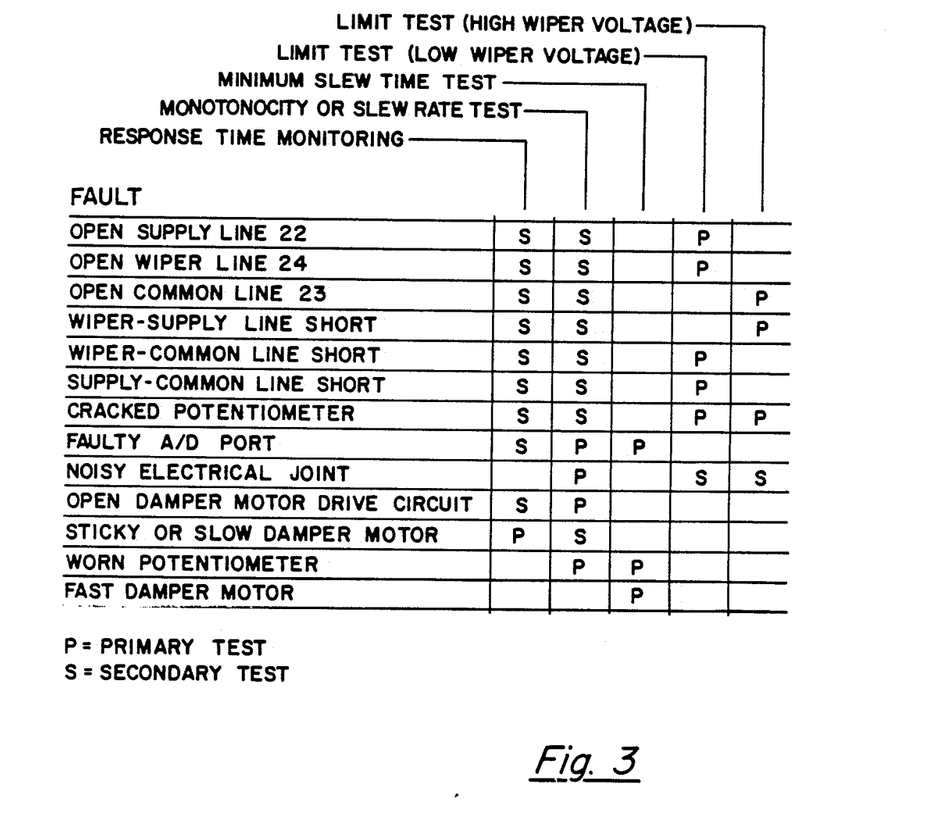
FIG. 3 is a table that relates specific tests to specific system problems.

In FIG. 3 a chart of five tests are compared with 13 different types of faults. It is believed that the chart is substantially self-explanatory, but in order to provide guidance the first fault will be specifically reviewed. If line 22 open circuits, the fault is primarily detected by a low wiper voltage being detected. This is indicated by the letter P. Two secondary tests may also be failed; the monotonicity test would be failed if the direction of voltage change is improper for the commanded direction of motor position change. The response time monitoring test would be failed because the rate of wiper voltage change would not be within acceptable limits. In the case of the burner control system disclosed in FIG. 1, the output of the flame safeguard sequencer 11 could respond to shut down the fuel burner 10 in a safe manner. Each of the faults in FIG. 3 is defined as having a primary or secondary test, and each is believed self-evident by comparing the fault and the indicated test.

Figure 4A:
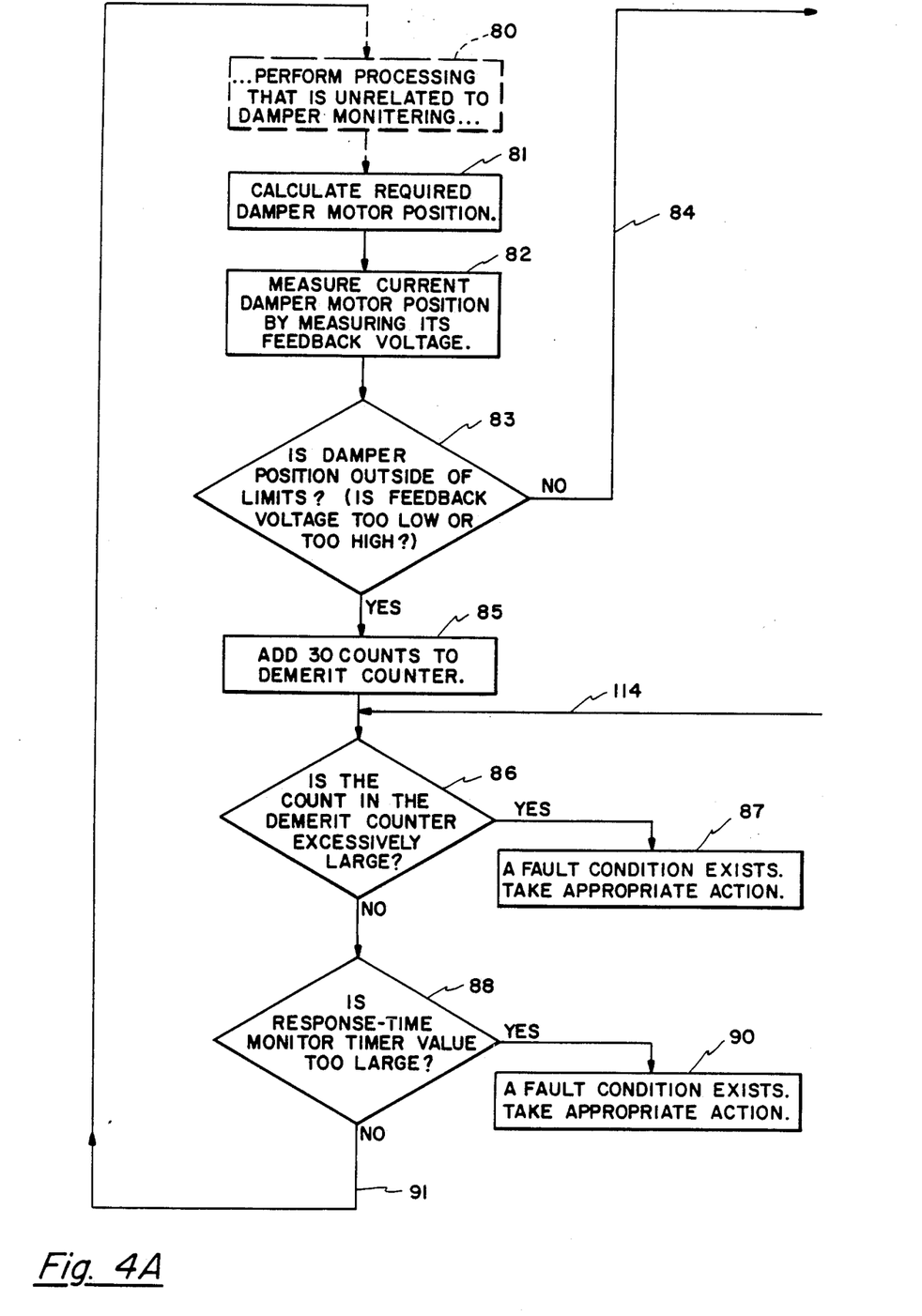
Figure 4B:
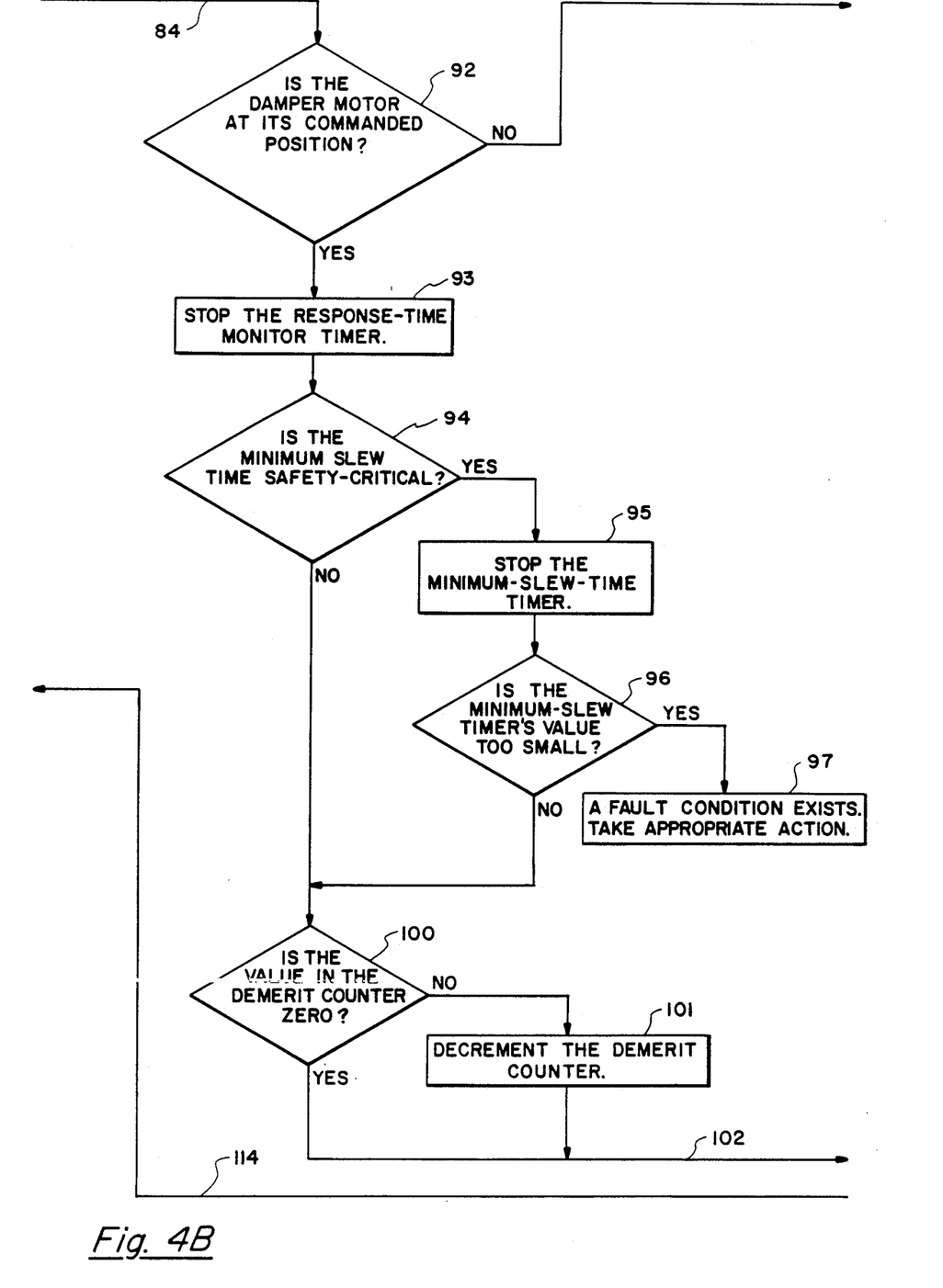
Figure 4C:
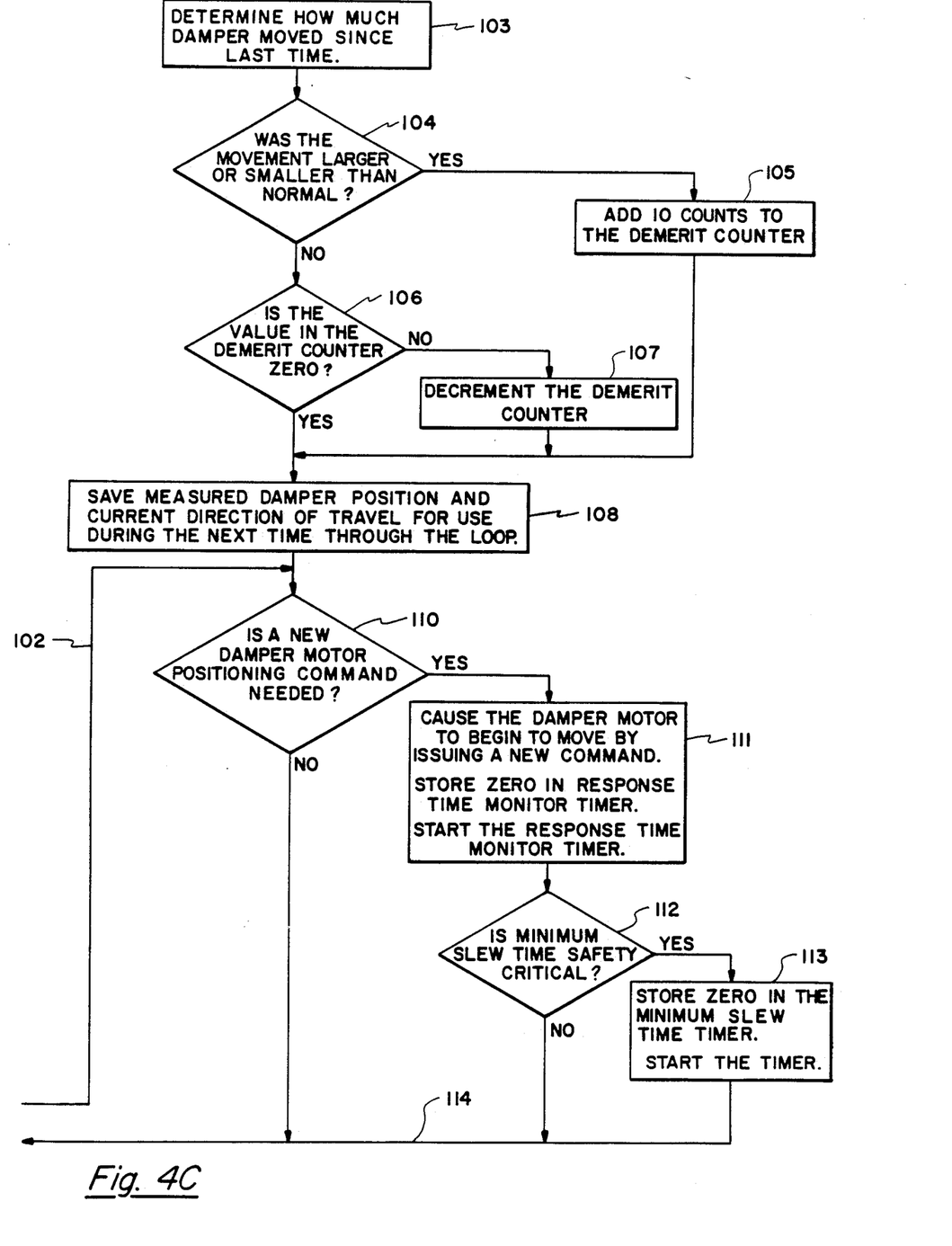

In FIG. 4 (A, B and C) a flow chart defining the present invention in detail is provided. The flow chart deals with the concept disclosed in FIG. 1 where a fuel burner 10 is operated in conjunction with the damper 15, and the damper 15 is monitored by potentiometer means 18. Also, the microcomputer control system 55 is presented as specifically including a demerit counter and timer as indicated at 71 in the concept of FIG. 2.

In FIG. 4 the system is defined at 80 as performing processing that is unrelated to the damper monitoring. The system progresses to 81 where a calculation of the required damper motor position is made. At 82, a measurement is taken of the current damper motor position by measuring the feedback voltage from the potentiometer means 18.

The system then progresses to a decision block 83 where a determination is made as to whether the feedback voltage is outside of acceptable limits. This test detects catastrophic failures such as opens or shorts. This is accomplished by the feedback voltage being measured as above or below fixed limits. If the decision at block 83 indicates that the feedback voltage is outside of its limits, the system at 85 adds 30 counts to a demerit counter 71 of FIG. 2. A large demerit count rate reduces fault reaction time. The system then progresses to the decision block 86 to determine if the count in the demerit counter is too large. If it is too large, a fault condition is determined to exist and appropriate action is then taken at block 87 (such as a system shutdown and alarm). If the demerit count is within acceptable limits, the decision making process then progresses to 88 where the response time monitor timer is tested to determine if the time it takes the motor to reach its desired position is too long; this detects an inoperative motor or position feedback system. If the response time monitor's value is too large, a fault condition is indicated at 90 and appropriate action is again taken. If the response time monitor's value is within acceptable limits, exit is made via path 91 and the sequence is repeated. When the test of block 83 is encountered, and if the feedback voltage is within limits, exit is via line 84 to block 92.

A decision is made at 92 as to whether the damper motor is at its commanded position. If the outcome of that decision is yes, the response time monitor timer is stopped at 93 and an inquiry is made at 94 as to whether the minimum slew-time is safety critical. (Some burner control systems utilize the time that it takes the damper to open and close as a purge period. If the position feedback system is faulty, the purge period would be shortened. For cases like this, the sequencer sets flag that is tested at block 94. The slew timer's value is compared against a minimum value at block 96. The appropriate action could be to hold the flame safeguard sequencer (11, FIG. 1) until the minimum slew time is enforced, or to shut the system down and alarm). If the minimum slew time flag was not set, the output of the decision block 94 then flows to decision block 100 to determine whether the demerit counter is at zero. If it is not, the counter is decremented at 101. Thus, the demerit counter gradually returns to zero (but is prevented from becoming negative by decision block 100)

during successive passes through these logic blocks, whenever normal operation is prevalent.

At the decision block 92, if it has been decided that the damper motor is not at its commanded position, a determination is made at 103 as to how much the damper has moved during the time interval between damper position tests. The change in damper position per unit time is tested at 104 to determine whether the movement was larger or smaller than normal. If it was abnormal, the demerit counter has counts added at 105. (This monotonicity or slew rate test detects abnormal rates of change in damper feedback voltage). If it was not, the process continues to a decision block 106 to determine whether the demerit counter is at zero. If it is not, the counter is decremented at 107. The system next moves on to 108 where the information is saved for use in the next time through the loop.

The system then proceeds to 110 where an inquiry is made as to whether or not a new damper motor position command is needed. If it is, the system proceeds to 111, the damper motor is caused to move by issuing a new command and the response-time timer means is activated. The minimum slew time flag is tested at 112. If it is set, the slew timer is reset and the timer is restarted. If at 112 the slew-time flag was not set, the system proceeds through another loop via 114.

The flow chart of FIG. 4 (A, B and C) enumerates in great detail an actual program for operating a damper 15 in a burner means 10. While this detailed flow chart has been provided, it is obvious that a system as disclosed in FIG. 2 can be applied in a much broader sense, and that all of the parameters are well defined by the chart of FIG. 3. The multiple examples disclosed in the present text clearly would lead one skilled in the art to many other variations of the position monitoring system using a potentiometer and wiper of the present invention. As such, the applicants wish to be limited in the scope of their invention solely by the scope of the appended claims.

The embodiments of the invention in which an exclusive property or right is claimed are defined as follows:

1. A flame safeguard sequencer system for the control of a fuel burner upon the operation of controller means with said fuel burner having damper means, ignition means, fuel supply means, and flame sensor means, including: a flame safeguard sequencer connected to said damper means, said ignition means, said fuel supply means, and said flame sensor means to sequentially purge, ignite and operate said fuel burner in a predetermined timed sequence upon operation of said controller means; said flame sensor means energized by said sequencer to monitor said burner for the presence or absence of flame upon said controller means operating to initiate the operation of said fuel burner; a fail-safe position monitoring system for said damper means with said damper means having motor means and motor position feedback potentiometer means; said flame safeguard sequencer further having voltage output means; said voltage output means providing an energizing voltage to said potentiometer means; said motor means including said feedback potentiometer means with said motor means constructed and arranged to operate a wiper of said feedback potentiometer means to provide a feedback voltage to said flame safeguard sequencer as an indication of a position of said damper means; said sequencer having input means receiving said feedback voltage; said sequencer further including microcomputer means having memory means, and said microcomputer means with said memory means comparing said feedback voltage provided by said feedback potentiometer means and said energizing voltage with nominal voltage levels stored in said memory means for sensing proper operation of said sequencer; and said sequencer including in said microcomputer means a safety system means for comparison of said feedback voltage to an established nominal voltage level profile stored in said memory means to check the accuracy of the position monitoring system.

2. A flame safeguard sequencer for the control of a fuel burner as claimed in claim 1 wherein said microcomputer means includes means for testing the monotonicity of the feedback voltage.

3. A flame safeguard sequencer for the control of a fuel burner as claimed in claim 2 wherein said motor means is an electrically operated reversible motor.

4. A flame safeguard sequencer for the control of a fuel burner as claimed in claim 3 wherein said potentiometer energizing voltage is established by a regulated voltage source within said sequencer; said energizing voltage and a potentiometer wiper voltage being monitored by an analog-to-digital converter; and said analog-to-digital converter connected to provide a digital voltage to said microcomputer.

5. A flame safeguard sequencer for the control of a fuel burner as claimed in claim 4 wherein said microcomputer includes counter and timer means, the contents of said counter and timer means comprising fault demerits which accumulate responsive to the comparison of the feedback voltage by the safety means; and said microcomputer means responding to said counter and timer means to safely stop said burner when said fault demerits accumulate at a rate exceeding a predetermined acceptable rate of fault demerits that is established and stored in said memory means.

6. A fail-safe electronic position monitoring system for motor means having motor position feedback potentiometer means, including: control system means having input means and output means with said input means responsive to a control input command, and having output signal means connected to control said motor means; said output means further providing an energizing voltage having a preselected level to said potentiometer means; said motor means having an output member adapted to operate a load; said motor means including said feedback potentiometer means with said motor means constructed and arranged to operate a wiper of said feedback potentiometer means to provide a feedback voltage to said control system means as an indication of a position of said output member; said control system means input means receiving said feedback voltage; said control system means including microcomputer means having memory means in which are stored nominal feedback and energizing voltage levels and a nominal established voltage level profile, said microcomputer means with said memory means comparing said feedback voltage and said energizing voltage levels respectively with the nominal feedback and energizing voltage levels stored in said memory means for sensing proper operation of said sequencer; and said microcomputer means includes safety system means for comparing said feedback voltage with the nominal established voltage level profile stored in said memory means to check the accuracy of the position monitoring system.

7. A fail-safe electronic feedback system for motor means having feedback potentiometer means as claimed in claim 6 wherein said microcomputer means includes means for testing the monotonicity of the feedback voltage.

8. A fail-safe electronic feedback system for motor means having feedback potentiometer means as claimed in claim 7 wherein said motor means is an electrically operated reversible motor.

9. A fail-safe electronic feedback system for motor means having feedback potentiometer means as claimed in claim 8 wherein said potentiometer energizing voltage is established by a regulated voltage source within said control system; said energizing voltage and a potentiometer wiper voltage being monitored by an analog-to-digital converter; and said analog-to-digital converter connected to provide a digital indication of each of said voltages to said microcomputer.

10. A fail-safe electronic feedback system for motor means having feedback potentiometer means as claimed in claim 9 wherein said microcomputer includes counter and timer means, the contents of said counter and timer means comprising fault demerits which accumulate responsive to the comparison of the feedback voltage by the safety system means; and said safety system means responding to said counter and timer means to safely stop said control system when said fault demerits accumulate at a rate exceeding a predetermined acceptable rate of fault demerits that is established and stored in said memory means.

* * * * *

UNITED STATES PATENT AND TRADEMARK OFFICE
CERTIFICATE OF CORRECTION

PATENT NO. : 4,866,363
DATED : September 12, 1989
INVENTOR(S) : Paul B. Patton & William R. Landis It is certified that error appears in the above-identified patent and that said Letters Patent is hereby corrected as shown below:

Title page:

Inventors: insert --Paul B.-- before "Patton"

Column 4, line 31 cancel "ca" and add --can--.

Column 6, line 57, add --a-- between "sets" and "flag".

Signed and Sealed this

Second Day of October, 1990

Attest:

HARRY F. MANBECK, JR.

*Attesting Officer*      *Commissioner of Patents and Trademarks*